Patented Sept. 24, 1940

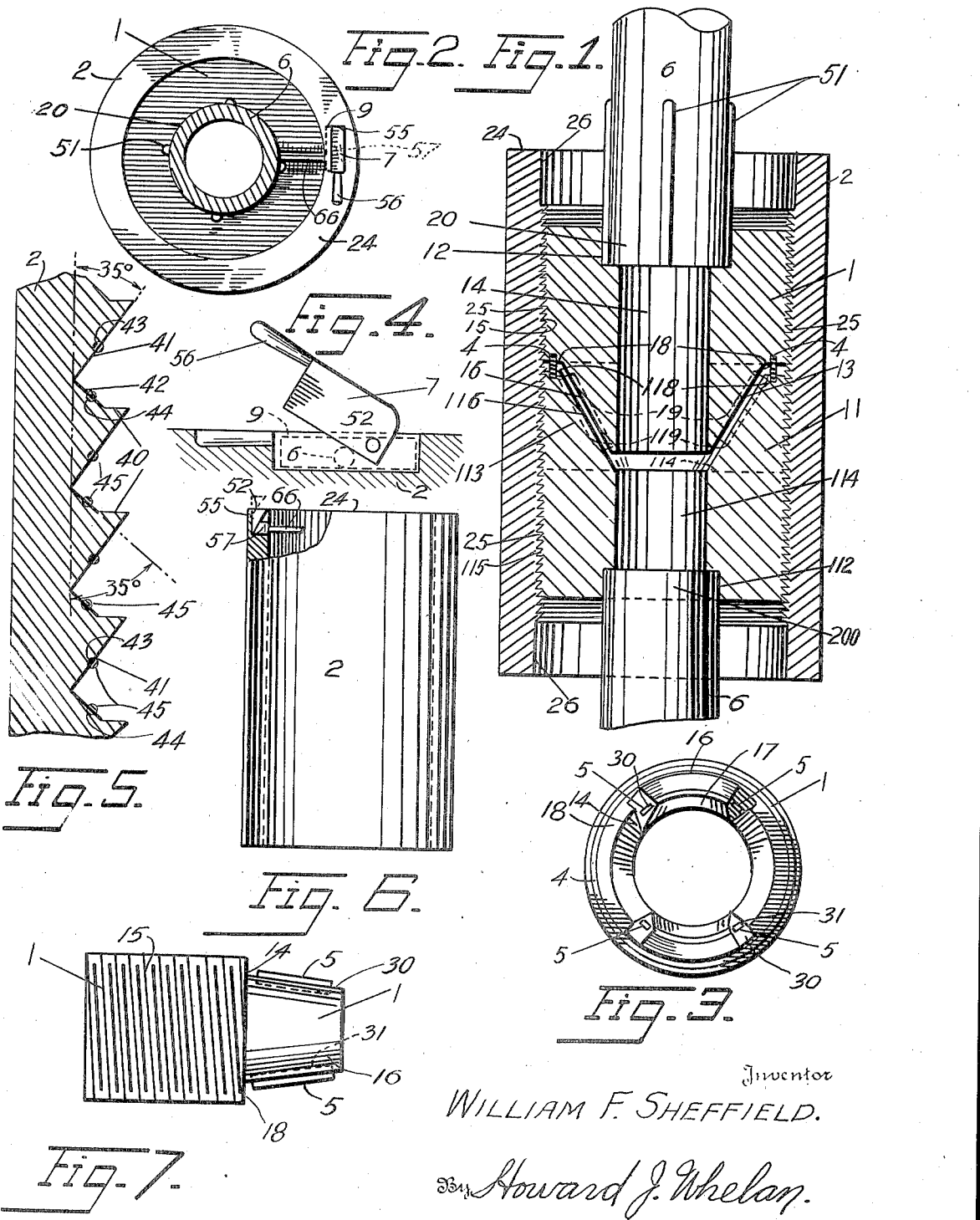

2,215,770

UNITED STATES PATENT OFFICE 2,215,770

DRILLING SHAFT COUPLING

William F. Sheffield, Baltimore, Md.

Application September 29, 1939, Serial No. 297,045

1 Claim. (Cl. 285—146)

This invention refers to couplings used for hollow oil drilling shafts used in well drilling equipment, and is an improvement of the form shown and described in applicant's previous Patent No. 2,094,416 issued September 28, 1937. The objects of this invention are to improve the operation of an oil drilling shaft, by making it less liable to leak under the high pressures used in the work, and to lock it more securely against unloosening effects. Another object is to eliminate the use of set screws usually installed and screwed in place from the peripheral surfaces of the outer sleeve, and to provide instead, an arrangement that is accessible to the assembler in a more convenient manner and not so liable to be obstructed with mud and dirt. A further object is to have a special form of screw connection between the unit parts that will adapt itself more appropriately to the stresses placed upon the screw threads during drilling works, and easier to unloosen at removal or disconnection. Still another object is to overcome the freezing of the surfaces of the coupling contacting together, due to the rusting or oxidizing thereof.

Other objects will become apparent as the invention is more fully set forth.

It has been found out in practice that the use of set screws in the outside sleeve unit has a tendency to collect mud and dirt. This covers the heads of the screws, and under high pressure in the well, the material from the ground becomes hardened tightly thereon, rendering the removal of the coupling difficult, time consuming, and inconvenient. This invention provides a pin mechanism for the purpose, that is located away from the peripheral surfaces of the coupling sleeve. It is operated from the flat horizontal face of the sleeve where it is more readily accessible. This pin mechanism is pressed down and locks in between corrugations or ribs vertically formed on the end portion of the hollow drill shaft for the purpose. It projects sufficiently to engage and lock thereon when operated. To prevent the rusting of surfaces of the coupling together through oxidization, gaskets of copper or other soft metal are placed in between where they will lessen the tendency, at the main contacting locations and serve to keep the coupling leakproof in longitudinal and transverse directions even under the heavy and continuous stresses involved in its use. The structure as made, gives a more desirable coupling. It assembles quietly and smoothly and sets tightly and rigid in a unit when brought up to the required tightness. The manner in which it tightens is gradual and may be gauged by the operator, and with the special shaped teeth provided, the parts center themselves accurately in the coupling and prevent the bore of the shafts in the attaching units from getting out of alignment. The screw threads are made on a quasi saw-tooth sectional form and are provided with sealing gasket cords of soft metal on the threads to take up any space through which leakage might occur in between the screw threads.

In the drawing which illustrates a form of this invention:

Figure 1 is a sectional elevation through the central axis of a coupling embodying this invention indicated connecting two well drilling shafts together, Figure 2 is a plan view of Figure 1, Figure 3 is a plan view of a spud unit used with this invention, Figure 4 is a detail of the pin mechanism used in this invention, Figure 5 is a sectional view through the screw threads used for the sleeve and spud units to show their critical construction, Figure 6 is a side elevation of the sleeve unit with portions broken away to show the operation of the pin mechanism, and Figure 7 is a side elevation of a spud unit.

Similar reference characters refer to similar parts throughout the drawing.

The structure of the device consists of three principal units, 1, 11, and 2. The units 1, and 11 are similar and symmetrical in main general respects and are arbitrarily termed the spud units because they are welded or swaged rigidly to the end portions of the drill shafts 20 and 200 respectively. The remaining unit 2 is arbitrarily termed the sleeve unit and covers and binds together the other two units. The spud units 1 and 11, have recesses 12 and 112 respectively arranged to take the end portions 20 and 200 tightly and securely and are welded in place. The units have central passages 14 and 114 respectively sized and formed to coincide and align with the bores 21 and 22 of the shafts 6 and 7. The units 1 and 11 have jaws 13 and 113 respectively projecting from their end portions 14 and 114 and with their sides 16 and 116 angularly formed symmetrically to coact with each other and form a close connection. The general form is preferably as indicated in the drawing. The body of each spud unit is externally screw threaded with a special form of quasi saw-tooth section screw thread having critical angles of 35 degrees, and conforming with the internal screw threads in the sleeve unit 2, indicated at 15, 115 and 25 respectively. The end portions 26 of the sleeve are enlarged internally without screw threads to enable the spud units to be readily inserted, or simply one end portion of the sleeve may be so arranged that the pin mechanism may operate therein. The latter form is indicated in Figure 1, and the former in Figure 8. The screw threads consists of flat transverse faces 40, angular faces 41, and interconnecting faces 42, as indicated in Figure 5. The screw threads on the spud units are additionally provided with helical grooves 43 and 44 in the faces 41 and 42 respectively for the insertion of gasket cord 45 of soft metal. The purpose of this gasket cord is to prevent any leakage through the joints between the screw threads when made up. The form of the screw threads is to make them self-cleaning and cause them to align the jaws on the spud units in the central portion thereof. The jaws coincide internally with the internal bores of the spuds and converge sidewise and externally as indicated. The bevel faces 16 and 116 conform and coact with the throat faces 17 and 117 respectively in the connecting units. The flat ledges 18 and 118 of the spud units are grooved at 19 and 119 with a ring gasket 4. The converging sides 30 and 130 of the respective jaws also have grooves 31 and 131 for the insertion of a straight gasket 5 of soft metal which serves to prevent leakage in between, as they are pressed towards each other by the sleeve unit 2 on tightening. Between these faces that are wedged together, and between the horizontal surfaces of the ledges the gaskets of soft metal, enable them to take up the external pressures on the joints and squeeze into a tight connection as well as take up the vibrations of usage. This prevents the opening up of the joint and the incident leakage under the high pressures that arises so frequently in other types of couplers. The sleeve 2 is left without screw threads on its upper internal portion for various practical reasons. This is also to permit vertical corrugations or ribs 51 to be formed on the shafting 6 on either spud and arrange lock spaces between which a pin mechanism 52 in the sleeve 2 may press. The purpose of this pin mechanism is to locate a means for locking the sleeve against rotation. It is disposed on the upper ledge 24 of sleeve 2 where it will be accessible from above and out of lateral placement. Lateral placement has been found to be the cause of difficulties in attachment and disconnection, while the new position avoids same. The pin moves in between the adjacent corrugations and stays there, preventing the rotation of the drill shafting in the sleeve 2. In other words it makes the coupling connection rigid in its attachment. At the same time it is relatively simple and manipulated easily. It is in two parts, one of which has the pin 66 mounted on a wedge shaped piece 7, that moves towards the shaft. The other part 9 is also wedge shaped and is pushed down between the first part and the back of the recess 55 in which it works to force the pin out. A handle 56 is provided to operate it, and a spring 57 returns the pin 66 into the wall of the sleeve when the handle 56 raises the piece 7 out of the recess 55.

The assembly of the coupling follows a conventional method in its manner of screwing on the coupling sleeve. As the upper drill shafting is brought into place with spud 1, secured to its bottom end 20, the sleeve 2 is screwed thereon with the portion facing the drill shafting. The exact placing of the spud unit is not material at this moment, since the screw threads permit the necessary adjustment afterwards. After the sleeve unit 2 and spud unit 1 are located relative to each other the shafting with the spud unit 11 is placed so the jaws 13 will insert themselves between the auxiliary jaws 113 and tighten on the gaskets in between. After this is done, the sleeve 2 is screwed on the spud units and brought securely and tightly into contact with them. When properly secured, the pin mechanism is pressed down and engaged between the corrugations 51, to prevent any of the units rotating out of connection with each other, and thereby unloosening the coupling.

While but one form of the invention is indicated, it is understood that other forms could be made that would employ the same principles and come within the scope of the appended claim. Having thus described the invention, what is claimed is:

In an oil drilling shaft coupling of the class described, the combination of a pair of symmetrical units of cylindrical form with their external peripheral surfaces screw-threaded throughout their lengths and having their central portions removed to form a passage therethrough with each having one end enlarged and counterbored to take the end portion of a drilling shaft to be inserted therein and joined in the coupling, one of the units being arranged to mechanically lock on its respective drilling shaft to enable same to rotate together, the screw threads aforesaid being three angle in outline and formed with adjacent angular face planes having grooves therein and with interconnecting faces joining the angular and transverse faces together and provided with a continuous groove therein, a plurality of evenly spaced jaws projecting longitudinally from the units from the ends opposite to the counterbores aforesaid with passages therethrough corresponding with the aforesaid passages, the jaws being externally tapered from their bases on the units to the extending ends with their side surfaces grooved longitudinally for packing, said jaws being arranged on each unit to align and fit between the corresponding jaws of the second unit so as to lock with each other and rotate together, a sleeve of a cylindrical form with its internal surface screw threaded to correspond with the external screw threads on the units, to permit their insertion and adjustment therein together, said sleeve being substantially longer than the combined length of the units and bored out to keep the screw threads thereof away from its ends, substantially as described.

WILLIAM F. SHEFFIELD.